United States Patent [19]

Wong

[11] 4,278,784

[45] Jul. 14, 1981

[54] ENCAPSULATED ELECTRONIC DEVICES AND ENCAPSULATING COMPOSITIONS

[75] Inventor: Ching-Ping Wong, Lawrence Township, Mercer County, N.J.

[73] Assignee: Western Electric Company, Inc., New York, N.Y.

[21] Appl. No.: 119,077

[22] Filed: Feb. 6, 1980

[51] Int. Cl.$^3$ .............................................. C08G 77/04
[52] U.S. Cl. ...................................... 528/27; 357/72; 528/17; 528/28; 528/21; 427/96; 525/437; 525/474
[58] Field of Search ...................... 357/72; 528/27, 28, 528/17, 21; 427/96; 525/437; 525/474

[56] References Cited

U.S. PATENT DOCUMENTS

| | | | |
|---|---|---|---|
| 2,465,296 | 3/1949 | Swizz | 174/21 |
| 3,065,194 | 11/1962 | Nitzsche et al. | 260/37 |
| 3,334,067 | 8/1967 | Weyenberg | 260/46.5 |
| 3,592,795 | 7/1971 | Ashby | 260/46.5 |
| 3,816,164 | 6/1974 | Pepe et al. | 117/72 |
| 3,890,278 | 6/1975 | Lehn et al. | 528/37 |
| 3,900,600 | 8/1975 | Spaulding | 427/99 |
| 3,919,438 | 11/1975 | Urkevich | 427/54 |
| 4,017,496 | 4/1977 | Jaffe et al. | 264/272 |
| 4,048,356 | 9/1977 | Bukos et al. | 427/379 |
| 4,116,887 | 9/1978 | Lehn et al. | 528/37 |
| 4,123,586 | 10/1978 | Bettes et al. | 428/391 |
| 4,138,543 | 2/1979 | Bargain et al. | 528/21 |

FOREIGN PATENT DOCUMENTS

76-11377 of 0000 Japan .

OTHER PUBLICATIONS

Pedersen, J. Am. Chem. Soc., 89, 7017 (1967).
Chemical Abstracts, Mar., 1976, 39929 q.
La Coste et al., Polymer Letters Edition, 14, pp. 201–206 (1976).
Bormann et al., *Tetrahedron*, 31 pp. 2791–2793, Pergamon Press (1975).
Dietrich et al., *Tetrahedron*, 29, pp. 1647–1658, Pergamon Press (1973).
Bormon et al. "Preparation Et Etude Des Properties Complexantes Des Polycondensats Contenant. Des Diazapolyoxamacrocycles Dans La Chaine Principale," Tetrahedron, vol. 31, pp. 2791–2793, (1975) Pergomon Press, Gt. Britain

*Primary Examiner*—Melvyn I. Marquis
*Attorney, Agent, or Firm*—J. F. Spivak

[57] ABSTRACT

An electronic device such as an integrated circuit is encapsulated with a silicone resin formulation comprising a polysiloxane having a cryptate ether as part of the backbone of the polymer chain for preventing migration of cations, e.g., sodium and potassium.

10 Claims, No Drawings employed in the art for sealing with silicone resins. It should be understood that any cryptate ether capable of such condensation reaction is suitable in the practice of this invention. Preferred cryptate ethers for the trapping of sodium and potassium ions are those which have cyclic dimensions such that strong complexes are formed with the sodium nd potassium ions, e.g., Kryptofix 21 or Kryptofix 22. Therefore, cryptates which are very small in structure and which, therefore, have difficulty in fitting in a sodium or potassium ion within its cage are not preferred for this purpose and similarly cryptate ethers having extremely large structures such that any bonds which may be formed for complexing the sodium or potassium would inherently be weak are also not preferred for this purpose. It should also be noted that heterotricyclic cryptates such as Kryptofix 211, 221 or 222 are not suitable for this purpose since one cannot reach such cryptate ethers with an actively terminated polymer to obtain a desired condensation reaction as specified above. Furthermore, while substituted cryptates can be used, that is cryptates to which the hydrogen atom attached to the nitrogen atom of the cryptate molecule is substituted by an organic radical, the organic radical must have terminal groups which are capable of entering into the condensation reaction with the resin polymer or otherwise react with it so as to enter the polymeric structure.

In general, a typical polymer coating in accordance with this invention may be prepared by mixing an hydroxyl terminated silicone, wherein the silicone may be characterized by the formula:

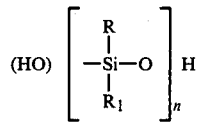

where R and $R_1$ are hydrogen or organic radicals, for example, organic radicals selected from alkyl radicals typically having from 1 to 18 carbon atoms, such as methyl, ethyl, propyl, butyl, isobutyl, and the like; aryl radicals such as phenyl, diphenyl, naphthyl and the like; alkaryl radicals such as, benzyl tolyl, xylyl, ethylphenyl and the like; alkoxy radicals such as methoxy, propoxy, butoxy and the like; aryloxy radicals such as phenoxy and the like; alkenyl radicals such as vinyl, allyl and the like; cyanoalkyl radicals and halogen substituted alkyls, aryls, alkaryls, alkoxys, etc.; with a cryptate ether represented by the formula:

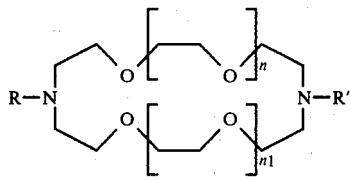

wherein n and $n_1$ can be integers from 0 to 4 and R and R' can be hydrogen or an organic radical capable of entering into a condensation reaction with the hydroxyl terminated siloxane such as a carboxylic acid, amine, alkylalkoxy, alkylaryloxy, aryl and the like. Preferably, the reaction is performed in the presence of a catalyst such as an organo-titanium catalyst.

The polymer thus formed is then added to the polysiloxane encapsulant in a quantity so as to provide at least a stoichiometric quantity of cryptate groups required for trapping the sodium and potassium ions.

The polymer may be represented by the formula:

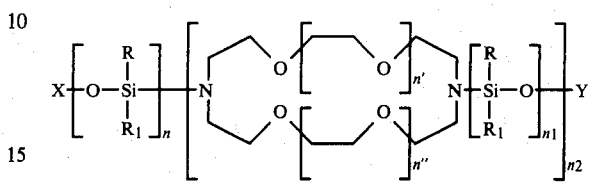

wherein n is an integer greater than or equal to zero e.g., from 0 to 5,000, $n_1$ and $n_2$ are integers greater or equal to 1, e.g., 1 to 50,000, n' and n" are integers from zero to 4, R and R are organic radicals as set forth above with reference to the hydroxy terminated silicone and X and Y are terminal groups such as hydrogen, alkyl, aryl, alkaryl, alkenyl and the like.

A preferred combination of siloxane and cryptate ether is hydroxyl terminated polydimethyl siloxane with either 15-crown-2,1 cryptate ether (4,10,13-trioxa-1,7 diazacyclopentacane) or 18-crown-2,2 cryptate ether (4,7,13,16-tetraoxa-1,10-diazacyclooctadecane). The following general procedure was followed for the preparation of novel encapsulating compositions and for encapsulating integrated circuit devices therewith. A predetermined quantity of a cryptate ether having two nitogen atoms in the ring are dissolved in a solvent, a proton withdrawing material such as triethylamine or preferably, 18-bis (dimethyl amino)-naphthalene, available as Proton Sponge from Aldrich Co., is added to the cryptate solution causing deprotonation or weakening of the hydrogen bonded to the nitrogen of the cryptate. If the molar quantity of deprotonating compound is equal to the molar quantity of cryptate, only half of the nitrogen bonded hydrogens are withdrawn, where if at least twice the molar quantity is used, all the nitrogen bonded hydrogen atoms can be freed. Only deprotonated sites are available for condensation. The deprotonating compound which is in solution is added in dropwise to the cryptate solution. The mixture is stirred for ½-2 hours. A hydroxyl terminated silicone resin such as a hydroxyl terminated polydimethyl siloxane together with a catalyst such as tetra-n-butyl titanate diluted 1:1 in xylene and a crosslinking agent, such as trimethoxymethylsilane and a stabilizer, such as nickel acetylacetonate are added to the deprotonated cryptate solution with stirring overnight. The resultant mixture is flow coated over the integrated circuit to be encapsulated and cured at room temperature for 16 hours and then at 120 C. for 4–6 hours. It should be understood that the silicone-cryptate compound can be added to or diluted with other polymers or polymeric precursors in which it is soluble, preferably prior to curing to form the encapsulant composition. For example, after reacting the cryptate with the silicone, additional silicone resin can be added to the silicone-cryptate polymer. Specific examples of this procedure are set forth in tabular form below.

ENCAPSULATED ELECTRONIC DEVICES AND ENCAPSULATING COMPOSITIONS

TECHNICAL FIELD

This invention relates to electronic devices such as semiconductor devices and integrated circuits having a polymeric silicone encapsulant therefor, and particularly, to electronic devices wherein the silicone encapsulant includes a cryptate ring as part of the backbone of the silicone polymer resin for preventing migration of cations, e.g., sodium and potassium ions.

BACKGROUND OF THE INVENTION

It is known that sodium and potassium ions are major contaminants of semiconductor materials and devices, especially integrated circuits. These ions tend to migrate through the device material, especially under an applied bias and in the presence of moisture and halogen environments. When the ions migrate to a p-n junction, they pick up an electron and become metallic elements which deposit on the p-n junction. Accumulation of these materials cause the device to short and fail. It is particularly difficult to control the presence of sodium and potassium ions since they are abundant materials in our general living environment. For example, contamination from fingerprints, residual solder fluxes and processing salts frequently leave a residue of these alkali metal ions, and particularly, sodium ions.

Various polymeric silicone resins, such as RTV silicone elastomer has been used as an encapsulant or sealant material to protect electronic semiconductor devices from mechanical damage and temperature and humidity effects of the environment. However, in the manufacturing processes employing and preparing the silicone materials used in the preparation of the elastomers, trace amounts of sodium or potassium are almost always present. When the encapsulant is employed on the electronic device, these ions tend to migrate as mentioned above, causing device failure. Consequently, a way to eliminate these contaminants or reduce their ability to migrate, especially when used as an integrated circuit encapsulant is needed. Since it is not practical to eliminate these ions from the manufacturing process of the silicones, the technique of ion trapping these contaminants has been employed.

As reported in *Chemical Abstracts,* March, 1976, page 39929q, Kineda et al. obtained a Japanese patent, Patent No. 76-11377, covering the use of certain macrocyclic-polyetheramines, known as cryptate ethers, in semiconductor sealing resin compositions for the purpose of acting as an alkali metal ion getter. The particular cryptate ether described in this reference is a 2,2,2 cryptate ether which is a tricyclic cryptate ether. While these cryptate ethers may effectively trap the alkali metal ions, when used in the form as described in Kineda, they ae free to migrate in the silicone polymer. This migration has two disadvantages, one being the fact that these ethers are known to have some toxicity associated with them and migration of the ether to the surface can contaminate the surface with a toxic material. In addition, migration of the ethers may allow some migration of the alkali metal ion complex therewith to the area of the p-n junction where, if the potential at the junction is high enough, it may cause the complex to breakdown resulting in deposition of the metal at the junction and shorting of the junction. I have discovered that cryptate ethers can be incorporated in the silicone resin composition so as to maintain its ability to trap the alkali metal ions but which are not free to migrate through the polymer structure.

SUMMARY OF THE INVENTION

An article of manufacture comprises an electronic device having an encapsulant thereover wherein the encapsulant comprises a polymeric chain which includes a cryptate ether as part of the polymeric chain.

DETAILED DESCRIPTION OF THE INVENTION

Silicone resins are known to be preferred encapsulants for electronic semiconductor devices. However, these silicone resins often are contaminated with ions, particularly, sodium and potassium ions. Because of the deleterious effect of the presence of these ions on electronic devices, such as integrated circuits, it is desirable to remove or trap the sodium or potassium ions so that they cannot migrate through the resin and ultimately react to form a metal deposit at various points on the semiconductor device. While the prior art, as previously pointed out, suggests the use of certain cryptate ethers as a dopant for silicone resins to accomplish this purpose, the cryptates are generally somewhat toxic and can migrate through the polymeric structure to the surface of the resin encapsulated device. I have discovered that by making the cryptate ether a part of the polymeric structure, the migration of the ether can be stopped, and hence, any toxicity related thereto substantially eliminated. Furthermore, any alkali metal ions trapped in the cryptate ether structure will also not be free to migrate and will remain trapped in fixed positions, thereby further enhancing the trapping effect of the ether on the ions. In accordance with this invention, the polymer containing the cryptate as part thereof is generally used as a dopant in a similar polymer not containing the cryptate.

One method of synthesizing a cryptate ether-polymer can be by virtue of a condensation reaction of the cryptate ether with the polymer. While the invention will be described herein in terms of a silicone-cryptate polymeric chain, it should be understood that polymeric encapsulants other than silicones can be reacted with a cryptate ether to form a polymer containing the cryptate as part of the chain for use as an encapsulant. Examples of other polymers which can condense with cryptates are polyalcohols, epoxies, hydroxy terminated polyesters, and the like.

A silicone resin polymer, monomer or oligomer which is hydroxyl terminated, such as the polymer, monomer or oligomer of hydroxyl terminated dimethylsiloxane or dihydroxy dimethylsiloxane itself can be reacted with a 1,1; 1,2; or 2,2; monocyclic cryptate ether, for example, Kryptofix 21, a commercially available cryptate ether sold by Pennisula Chemical Research Co., Florida and Merck, West Germany otherwise known as 4,10,13-trioxa-1,7, diazacyclopentadecane or Kryptofix 22 also known as 4,7,13,16-tetraoxa-1,10-diazacyclooctadecane, so as to form a condensation product thereof which is described below. This condensation product, which is a silicone polymer having the cryptate cyclic structure within the polymeric chain can then be added to a silicone resin as a dopant therein to form the desired sealant material. This material is then placed over the electronic device to be encapsulated or sealed by any of the well-known methods

| Ex # | Merck-Kryptofix Cryptate | Aldrich Co.-Proton Sponge 1,8-bis(dimethyl-amino)-naphthalene | polydimethoxy-siloxane (Union Carbide LC9000) | DuPont-Tyzor TBT titanate catalyst | stabilizer | solvent | Cross-linker |
| --- | --- | --- | --- | --- | --- | --- | --- |
| EX 1 | Kryptofix 21 0.5 gm (2.29 × $10^{-3}$ moles) in 5 ml xylene | 0.49 gm (2.29 × $10^{-3}$ moles) in 2 ml xylene | 12 gm (2.3 × $10^{-3}$ moles) of 100 centistoke fluid, M.W. 5200 in 10 ml xylene | 200 μ liters of 1:1 dilution in xylene | 24 mg | 10 ml xylene | 1.5 gm |
| EX 2 | Kryptofix 21 0.5 gm | 0.98 gm in 2 ml xylene | 12 gm in xylene | 200 μ liters 1:1 in xylene | 24 mg | 10 ml xylene | 1.5 gm |
| EX 3 | Kryptofix 22 .41 gm in 5 ml methanol | 0.49 gm in 2 ml xylene | 12 gm in xylene | 200 μ liters | 24 mg | 10 ml xylene | 1.5 gm |
| EX 4 | Kryptofix 22 .41 gm in 5 ml methanol | 0.98 gm in 2 ml xylene | 12 gm in xylene | 200 μ liters | 24 mg | 10 ml xylene | 1.5 gm |
| EX 5-8 | Repeat of EX 1-4, respectively, except 1,000 C.S. LC9000 polysiloxane used. | | | | | | |
| EX 9-12 | Repeat of EX 1-4, respectively, except that 8,000 C.S. (M.W. ~32,000) LC9000 polysiloxane used. | | | | | | |

What is claimed is:

1. A polymeric encapsulating composition comprising a polysilicone having a cryptate ether as part of the polymer chain.

2. The encapsulating composition recited in claim 1, wherein said polysilicone resin is produced by a condensation reaction of the polymer precursor with a cryptate ether.

3. The encapsulating composition recited in claim 2, wherein said polymer precursor is a hydroxyl terminated silicone and said cryptate ether has the general formula:

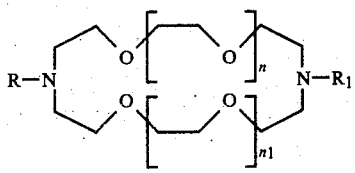

wherein n and $n_1$ are integers from 0 to 4 and R and $R_1$ are selected from hydrogen and organic radicals that will undergo a condensation reaction with said hydroxyl terminated silicone.

4. The encapsulating composition recited in claim 3, wherein said silicone is selected from hydroxyl terminated dimethylsilicone and hydroxyl terminated methyl methoxy silicone and the cryptate ether is selected from an ether having the structural formula:

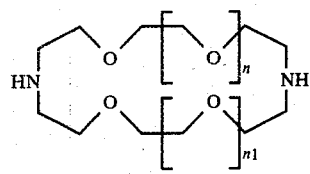

wherein n and $n_1$ are integers selected from 0 and 1.

5. A polymer having the general formula:

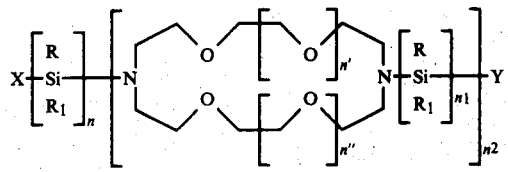

wherein n is an integer greater than or equal to zero, $n_1$ and $n_2$ are integers greater than or equal to one n' and n" are integers from zero to 4, R and $R_1$ are selected from the group consisting of hydrogen, and an organic radical selected from alkyl, aryl, alkaryl, alkoxy, aryloxy, alkenyl, cyano alkyl radicals and halogen substituted derivatives thereof, and X and Y are terminal groups.

6. An article of manufacture comprising an electronic device and a polysilicone encapsulant therefor, said polysilicone having a cryptate ether as part of the polymer chain.

7. The article recited in claim 6, wherein said polysilicone resin is produced by a condensation reaction of the polymer precursor with a cryptate ether.

8. The article recited in claim 7 wherein said polymer precursor is a hydroxyl terminated silicone and said cryptate ether has the general formula:

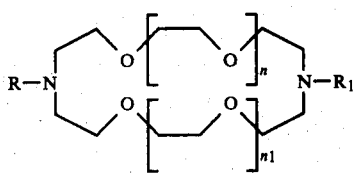

wherein n and $n_1$ are integers from 0 to 4 and R and $R_1$ are selected from hydrogen and organic radicals that will undergo a condensation reaction with said hydroxyl terminated silicone.

9. The article recited in claim 8, wherein said silicone is selected from hydroxyl terminated dimethylsilicone and hydroxyl terminated methyl methoxy silicone and the cryptate ether is selected from an ether having the structural formula:

10. The article recited in claim 6, wherein the polymer has the general formula:

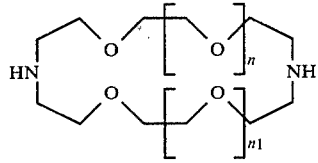

wherein n and $n_1$ are integers selected from 0 and 1.

$$X\left[\begin{array}{c}R\\|\\Si\\|\\R_1\end{array}\right]_n N\left[\begin{array}{c}\diagup O\diagdown\\\diagdown O\diagup\end{array}\right]_{n'} \left[\begin{array}{c}\diagup O\diagdown\\\diagdown O\diagup\end{array}\right]_{n''} N\left[\begin{array}{c}R-Si-O\\|\\R_1\end{array}\right]_{n1}\right]_{n2} Y$$

wherein n is an integer greater than or equal to zero, $n_1$ and $n_2$ are integers greater than or equal to one n' and n'' are integers from zero to 4, R and $R_1$ are selected from the group consisting of hydrogen, and an organic radical selected from alkyl, aryl, alkaryl, alkoxy, aryloxy, alkenyl, cyano alkyl radicals and halogen substituted derivatives thereof, and X and Y are terminal groups.

* * * * *

UNITED STATES PATENT AND TRADEMARK OFFICE
CERTIFICATE OF CORRECTION

PATENT NO. : 4,278,784

DATED : July 14, 1981

INVENTOR(S) : Ching-Ping Wong

It is certified that error appears in the above—identified patent and that said Letters Patent is hereby corrected as shown below:

On The Title Page, under "References Cited"

"4,017,496" should read -- 4,017,495 --.

Column 1, line 57, "ae" should read -- are --.

Column 3, line 19, "reach" should resd -- react --.

Column 6, claim 5, lines 23-33 and Column 8, claim 10, lines 1-9, should appear as shown on the attached sheet.

UNITED STATES PATENT AND TRADEMARK OFFICE
CERTIFICATE OF CORRECTION

PATENT NO. : 4,278,784

DATED : July 14, 1981

INVENTOR(S) : Ching-Ping Wong

It is certified that error appears in the above—identified patent and that said Letters Patent is hereby corrected as shown below:

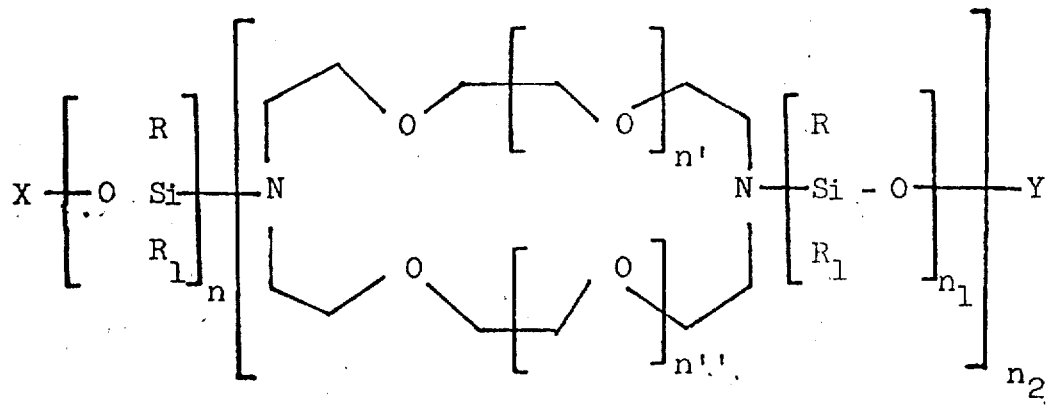

Signed and Sealed this

Second Day of February 1982

[SEAL]

Attest:

GERALD J. MOSSINGHOFF

Attesting Officer

Commissioner of Patents and Trademarks